DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 28, 1972

896 O.G. 1209

T896,055

COORDINATED IONIC HYDROCARBON COPOLYMERS

Victor Clarence Long, Parkersburgh, W. Va., assignor to E. I. du Pont de Nemours and Company, Wilmington, Del.

Continuation-in-part of application Ser. No. 569,045, Aug. 1, 1966, and a continuation of application Ser. No. 863,384, Oct. 2, 1969. This application Mar. 16, 1971, Ser. No. 124,925

Int. Cl. C08f *15/40*

U.S. Cl. 260—88.1 R

No Drawing. 21 Pages Specification

Coordinated ionic hydrocarbon copolymers of ethylene and alpha,beta-ethylenically unsaturated carboxylic acids of 3 to 8 carbon atoms containing at least 50 mole percent ethylene based on the copolymer, the alpha,beta-ethylenically unsaturated carboxylic acid content of the copolymer being from .2 to 25 mole percent based on the copolymer, the carboxylic acid groups of the copolymers being at least partially ionized by metal ions such as $Cu^{+2}$, $Co^{+2}$, $Ni^{+2}$, $Mg^{+2}$, and $Zn^{+2}$, the metal ions being present in an amount equivalent to from about 10 to 180 percent of the carboxylic acid groups, at least some of the metal ions of the copolymer being coordinated with at least one of the following: alkylene amines, n-heptyl amine, t-octyl amine, octadecyl amine, piperidine, piperazine and its derivatives, 8-hydroxyquinoline, o-phenylene diamine, hexamethylenediamine, morpholine and its derivatives, salicylaldehyde, salicylic acid, acetylacetone, o-dihydroxybenzene, 2-aminobenzene thiol, picolinic acid, anthranilic acid, electron donor dyes, poly(ethylene imine), and substituted poly(ethylene imine),